Figure 1:
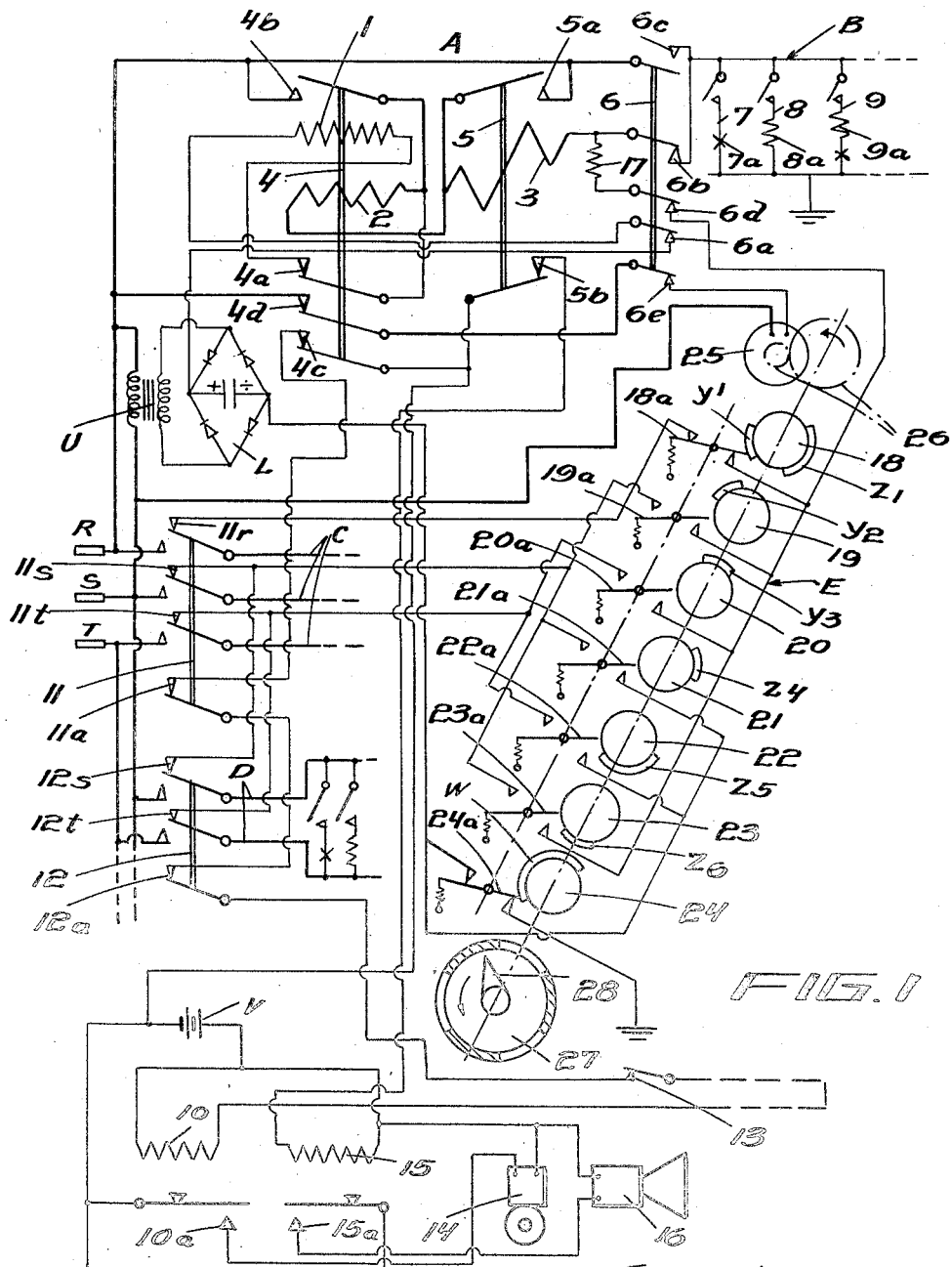

March 27, 1951     F. B. L. HAIN     2,546,443
INSULATION AND LOAD SUPERVISORY SYSTEM
Filed March 21, 1949     2 Sheets-Sheet 1

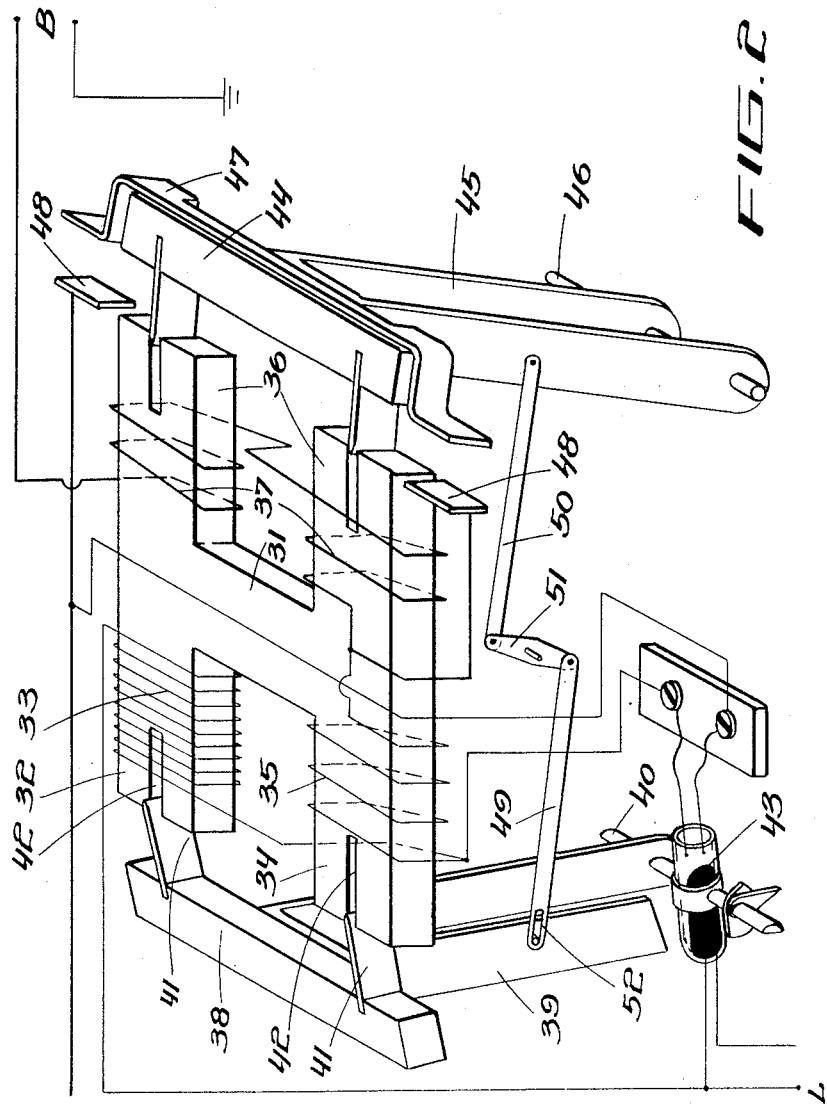

Patented Mar. 27, 1951

2,546,443

UNITED STATES PATENT OFFICE 2,546,443

INSULATION AND LOAD SUPERVISORY SYSTEM

Folke Bror Lorens Hain, Angelholm, Sweden

Application March 21, 1949, Serial No. 82,629
In Sweden March 22, 1948

5 Claims. (Cl. 177—311)

1

The present invention refers to electromagnetic relay systems, and more particularly electromagnetic relay systems adapted for the insulation supervision of electric installations.

The principal object of the invention is to provide a relay system by means of which the condition of insulation of electric installations may be kept under continuous supervision during periods when the installations are under no load.

A further object of the invention is to provide a relay system by means of which the condition of insulation of electric installations may be supervised, especially during periods when the installations are to be cut off from the power supply, from a central supervision station, particularly to enable e. g. a porter in a factory plant to determine quite easily, whether a load is switched on in any part of the plant or whether the load is switched off but an insulation fault exists somewhere.

Another object of the invention is to provide a relay system by means of which the condition of insulation of electric installations may be revealed, especially during periods when the installations are cut off from the power supply, at a central supervision station by delivering warning signals or alarm signals to enable a porter or other guard to distinguish between slight insulation faults causing only small leakage currents, greater insulation faults or other conditions causing greater currents to pass through the installation, and severe short-circuit faults in the installation.

According to the invention, the characteristic features of the electromagnetic relay system are that at least one of the load circuits of an electric installation, e. g. a lighting circuit, is at least during off-load periods connected to a supervising voltage through at least two series-connected windings of a relay which are adapted to actuate a single armature of the relay and which in respect of the number of turns and resistance are designed such that, at a flow of current through the windings of a magnitude caused by a small insulation fault in the load circuit under the said supervising voltage, they attract the armature, further that the load circuit, when the armature is attracted, is connected, while by-passing one of the series-connected windings, to the operating voltage of the installation through only the other of the said windings, said other winding being designed in respect to the number of turns and value of the resistance that, even though it may be insufficient alone to keep the armature attracted at the current which is produced by the normal operating voltage at the occurrence of a small insulation fault in the load circuit, it is capable of doing this at the current existing at the minimum normal load in the load circuit, and finally that the armature, when attracted, is adapted to actuate a circuit of a signal relay to provide warning signals.

The invention will be explained in detail in the following specification with reference to the accompanying drawing which illustrates, by way of example, a preferred form of the relay system according to the invention. In the drawing, Figure 1 is a circuit diagram of the relay system, and Figure 2 is a diagrammatic perspective view of a relay structure.

Referring to the drawing, and more particularly Figure 1, the relay system illustrated comprises a relay A which is provided with three windings 1, 2 and 3 mounted on a common iron core (not indicated in Figure 1) and two armatures (not illustrated in Figure 1) which are actuated one by the windings 1 and 2 and the other by the winding 3. A suitable form of the relay structure is shown in Figure 2 and will be described in detail later. The armatures are each arranged to operate a switch 4 and 5, respectively.

The relay A is adapted for connection in a circuit from a D. C. supply to a load circuit B, e. g. a lighting network, through a manual switch 6, so that this load circuit during periods when it is under no load has applied to it a predetermined supervising voltage. The D. C. supply may, for example, consist of a rectifier assembly L, which is supplied with alternating current through a transformer U from an A. C. source of supply which is shown as one phase R of a three phase supply circuit R, S, T. The winding 1 is so designed in respect of the number of turns and the value of resistance that, when connected in the circuit from the D. C. supply to the load circuit B, it is capable of attracting the associated armature in the presence of a weak current through said winding such as is caused by a small insulation fault in the load circuit B at the predetermined supervising voltage. The winding 2 associated with the same armature as winding 1 is connected in series with and in boosting relation to winding 1 through a back contact 4a of switch 4 and is so designed in respect of the number of turns and the value of resistance that the said winding is incapable of attracting the armature or even holding it attracted when passed by the same weak current as winding 1. Thus, the winding 1 has a very great number of turns of thin wire with high resistance, while the winding 2 has a considerably fewer number of turns of thicker wire. Furthermore, the winding 2 is so designed that it is sufficient alone to keep the armature attracted on the current occurring in the circuit thereof in the presence of the minimum normal load in the circuit B (at normal operating voltage), for example the current resulting when a single incandescent lamp in the circuit B is switched on. The third winding 3, which is connected directly in series with winding 2, is so designed in respect of its number of turns and value of resistance that it attracts its associated armature only in the presence of a higher current such as occurs at a relatively great load in the circuit B.

The positive terminal of the D. C. supply L is connected to one terminal of winding 1 through a contact 6a of the manual switch 6. The D. C. circuit passes from the third winding 3 through another contact 6b of the manual switch 6 to the load circuit B, which may comprise a number of parallel branches 7, 8, 9. The negative terminal of the D. C. supply L is connected to earth, this connection being periodically interrupted by means and for a purpose to be described later. The manual switch 6 has two positions, in one of which the entire relay A is disabled by the breaking of contacts 6a and 6b and the A. C. supply R is connected direct to the load circuit B through a contact 6c of the switch for supplying the loads during periods when these are switched on, for example supplying a lamp 7a connected in series with an associated switch 7b in the branch circuit 7. In the other position of the manual switch 6 the load circuit B is cut off from direct connection with the A. C. supply and is connected to the relay winding 3 through still another contact 6c of the manual switch 6.

The winding 2 of the relay A is connected to the A. C. supply through a front contact 4b of switch 4 so as to be energized by alternating current from said supply when the associated armature is attracted, while at the same time the said winding 2 is disconnected from the winding 1 and the D. C. supply L by the opening of back contact 4a.

The winding 3 which is arranged to attract the armature of the relay A operating the switch 5 is connected to the A. C. supply R through a front contact 5a of said switch so as to be energized by alternating current from said supply when the said armature is attracted, the winding 2 connected to the same supply through contact 4b being at the same time short-circuited by the contact 5a.

The relay system comprises a signal relay circuit including a relay 10, a back contact 4c of switch 4, back contacts 11a and 12a of main switches 11 and 12, respectively, for connecting other load circuits C and D, respectively, which will be further referred to later to the A. C. supply R, S, T, a door or similar contact 13 and a source of D. C. supply indicated as a battery V. It will be understood that this source should preferably be a rectifier assembly and that it may be the rectifier assembly L supplying the windings of the relay A, although to simplify the circuit diagram it has been shown as a separate source. The relay 10 has a back contact 10a connected in a circuit from the D. C. supply V through a bell 14 located at a central control point.

The relay system also comprises a second signal relay circuit including a relay 15, a back contact 5b of switch 5, and the D. C. supply V. The relay 15 has a back contact 15a connected in a circuit from the D. C. supply V through a sound alarm apparatus 16, for example of siren type.

The relay system thus far described operates in the following manner.

When every load in the circuit B is disconnected and the manual switch 6 is in the position indicated, this circuit has a supervising voltage applied to it from the rectifier assembly L through the three relay windings 1, 2 and 3 in series, and the switches 4 and 5 of the relay A are in the positions indicated. Provided that the main switches 11 and 12 for the load circuits C and D are in the off position in which said circuits are disconnected from the supply R, S, T and the door contact 13 is closed (the door closed and possibly locked), the circuit of signal relay 10 is closed and back contact 10a thereof open, so that the bell 14 is not sounded. Similarly, the circuit of signal relay 15 is closed and back contact 15a thereof open, so that the alarm 16 is not sounded either.

If there should be a small insulation fault somewhere in the load circuit B, however, the supervising voltage will cause a slight flow of current through it, which energizes the winding 1 (and also windings 2 and 3 although to a less or inappreciable extent) sufficiently to enable it to attract the associated armature, so that the switch 4 is operated to open contact 4a and close contact 4b and open contact 4c. The winding 1 is thus disconnected from the rectifier assembly L, and the switch 4 is automatically returned by the associated armature to its original position, again connecting said winding to the supervising voltage. At each operation of the switch the A. C. supply is connected to winding 2 by the closing of contact 4b, but as the insulation fault is small, the flow of current through said winding will be insufficient for keeping the armature attracted. Consequently, the switch 4 will continually oscillate between the two positions thereof in the case of an insulation fault in circuit B. By the operation of switch 4 back contact 4c is opened. This opens the circuit of signal relay 10, and the bell 14 will thus sound intermittently, as the switch 4 is oscillated.

If a small load, e. g. an incandescent lamp 8a, in the circuit B is switched on (while the manual switch 6 is still in the position illustrated), the switch 4 is operated by the flow of current from the supply L as already described, but in this case the current derived from the A. C. supply and passing through winding 2 by the closing of contact 4b is sufficient to keep the armature with which switch 4 is associated attracted. The bell 14 will therefore sound continuously. This will also occur, if the load consists of a small resistance 8a in branch circuit 8, which includes a contact associated with a fire-proof door. This resistance may be, for example, a red lamp.

The circuit of relay 10 may also be opened by the opening of door contact 13, which is associated for example with a gate, and the bell 14 will then sound continuously.

If a greater load is connected into the circuit B, for example, a fire alarm contact closes the branch circuit 9 through a very small resistance 9a, the current from the A. C. supply R through windings 2 and 3 after operation of switch 4 will be great enough to enable winding 3 to attract the armature associated therewith and operate switch 5. This causes interruption of the circuit of relay 15 at back contact 5b and closing of back contact 15a to sound the fire alarm 16.

The relay system illustrated in Figure 1 is also arranged for supervising the insulation of three-phase motor or other A. C. load circuits such as those designated C and D in Figure 1. Considering first the three-phase circuit C, the main switch 11 thereof is equipped with three auxiliary contacts 11r, 11s and 11t which are closed when the circuit is switched off and through which each phase of the load circuit C is connected with the relay A so as to provide a path from the D. C. supply L through the three windings 1, 2, and 3 of the relay and one of said auxiliary contacts to any of the phase circuits in which an insulation fault may occur. This path also passes through a resistance 17 in series with said windings to protect the winding 3 against short-circuit currents and through a contact 6c of the manual switch 6, which is closed in the position of said switch illustrated in Figure 1 but is opened when the switch is placed in the position for supplying power to circuit B as described above, and furthermore through a rotary multiple switch E which will presently be described.

The rotary multiple switch E comprises a rotor which is composed of axial sections 18 to 24 forming cam discs and is driven at a constant speed by a motor 25 through a suitable gearing 26. The motor 25 is energized by a circuit across phases R and S of the A. C. supply R, S, T passing through a back contact 4d of switch 4 and a contact 6e of switch 6 closed at the same time as contacts 6a and 6d. The cam discs 18 to 24 actuate contacts 18a to 24a, respectively, to close and open the same at different moments and for different periods of time.

The circuit from the relay A through contact 6d passes through the contacts 18a, 19a and 20a of the rotary switch E in parallel, and these contacts are each connected to one of the auxiliary contacts 11r, 11s and 11t in the order stated. The corresponding cam discs 18, 19 and 20 are each provided with a cam $y_1$, $y_2$ and $y_3$, respectively, for closing the corresponding contacts 18a, 19a and 20a, and these cams enclose an angle of 60° each and are offset an equal angle so as together to enclose half the circumference of the rotor. Accordingly, during the rotation of the switch E, the relay circuit will be connected successively to all three phases of the load circuit C. The contact 24a actuated by the last cam disc 24 is connected in a lead from the negative terminal of the rectifier assembly L to earth, and the cam disc 24 has a cam $w$ for closing said contact, this cam enclosing the same half of the circumference of the rotor as the three cams $y_1$, $y_2$, $y_3$. In the case of a fault in one of the phases of the load circuit C to earth, the relay A will therefore respond during the interval when the cam $y_1$, $y_2$ or $y_3$ closes the corresponding contact 18a, 19a or 20a. A dial 27 mounted at one end of the rotor and a pointer 28 mounted on the rotor axle indicate visibly to which of the phases the relay is connected at every instant.

The relay circuit may be completed at certain intervals determined by the rotary switch E through either two of the phases of the load circuit C, the earth connection of the negative terminal of the D. C. supply L being disconnected during these intervals which occur while contact 24a of the rotary switch is not closed by cam $w$. For determining said intervals the cam disc 18 is provided with a second cam $z_1$, while the cam discs 21, 22 and 23 are each provided with a cam $z_4$, $z_5$ and $z_6$, respectively, some of these cams $z_1$ and $z_4$ to $z_6$ partly enclosing the same angles and all of them together enclosing the second half of the circumference of the rotor. The contacts 21a and 22a are connected to the negative terminal of the D. C. supply L on the one hand, and to the auxiliary contacts 11s and 11t, respectively, on the other hand, while the contact 23a is connected to the relay A in parallel with contacts 18a to 20a, on the one hand, and to the auxiliary contact 11s, on the other hand. In the case of a fault of the insulation between the first and second phases of the load circuit C, the circuit from the relay A is completed through contact 18a, during the interval when this contact is closed by cam $z_1$, through contacts 11r and 11s, and through contact 21a to the negative terminal of the D. C. supply. The relay will therefore respond during the interval when the contact 21a is closed, this interval comprising one half of the closure interval of contact 18a. In the case of a fault between the first and third phases, the relay circuit will be completed through contact 18a, through contacts 11r and 11t, and through contact 22a to the negative terminal of the D. C. supply L during an interval while the overlapping cams $z_1$ and $z_5$ both close their associated contacts. The relay A will therefore respond during this interval. Finally, in the case of a fault between the second and third phases, the relay circuit will be completed through contact 23a, contacts 11s and 11t, and contact 22a to the negative terminal of the D. C. supply L during an interval while cams $z_5$ and $z_6$ both close their associated contacts. Accordingly, the relay A will respond during this interval. By observing on the dial 27 during which of the six cyclic intervals the bell 14 or alarm apparatus 16 is sounded, one may at once establish the location of the fault in or between the phases.

In addition to supervising the connection of the relay A to the three-phase load circuit C, the rotary switch E may also supervise the connection of the relay to the circuit D which is illustrated as a single phase load circuit connected between phases S and T of the A. C. supply through the main switch 12. For this purpose, this switch is provided with two auxiliary contacts 12s and 12t similar to the auxiliary contacts 11r, 11s and 11t of switch 11, and connected to the rotary switch in parallel with contacts 11s and 11t. Thus, the relay A will respond to insulation faults in the load circuit D during the same intervals as in respect of the second and third phases of circuit C.

The relay A employed in the system described above may be of many different forms. By way of example, a suitable relay structure will be described with reference to Figure 2. This relay comprises an iron core 31 in the form of an H lying horizontally. On one leg 32 of the core there is provided a winding 33 (corresponding to winding 1 in Figure 1) having many turns of thin wire, so that this winding has a great number of ampere-turns and a high resistance. The adjacent leg 34 carries a winding 35 (corresponding to the winding 2 in Figure 1) having a less number of turns of thicker wire. The other two legs 36 each carry one half of a third winding 37 (corresponding to winding 3 in Figure 1) having a still fewer number of turns and wound from thicker wire than winding 35. The legs 32 and 34 have an armature 38 cooperating therewith which is in the form of a straight bar of iron fixed to a U-shaped support 39 which is carried by an axle 40 pivoted in the stationary frame or casing (not shown) of the relay. The armature 38 is preferably provided with blade-shaped projections 41 which at the attraction of the armature to the pole faces of the legs 32 and 34 may enter corresponding recesses 42 in these pole faces in order to reduce the reluctance. The axle 40 carries a mercury rocker switch 43 which corresponds to the switch 4 in Figure 1. The other two legs 36 have associated therewith a second armature 44 which is constructed and arranged in the same way as armature 38 on a U-shaped support 45, so that it may rock on an axle 46 which is pivotally mounted in the frame or casing and is parallel with the axle 40. The armature 44 is besides provided with a contact bridge 47 which at the attraction thereof engages two contact members 48, the elements 47 and 48 forming the contact 5a of switch 5 in Figure 1. (The other contact 5b is not shown in Figure 2.) The armatures 38 and 44 may preferably but not necessarily be inter-connected by means of a link coupling consisting of two links 49 and 50 and a lever 51 pivotally mounted in the frame or casing. The link coupling functions to maintain the armature 38 in the attracted position thereof, when the armature 44 is in its attracted position, even though no magnetic force is acting on the armature 38. The link 49 being connected to the support 39 of armature 38 by means of a slot and pin joint 52, the attraction of armature 38, on the other hand, does not cause the armature 44 to be positively moved into its attracted position.

The connection in circuit of the relay is indicated in Figure 2 only by the wiring and is simplified compared with Figure 1 by the omission of some of the contacts of switches 4 and 5.

The two windings 33 and 35 are so adapted in respect of their number of turns and resistance that the magnetic force produced by the winding 33 alone, or even together with the winding 35, at a small flow of current through the windings such as is caused by a slight insulation fault at the existing supervising voltage, is capable of attracting the armature 38 but, on the other hand, the force due to the winding 35 alone at a flow of current of the same magnitude is insufficient to maintain the armature 38 attracted. Finally, the third winding 37 is so adapted that it attracts its armature 44 only at a greater load current which would cause a considerable drop of voltage in the winding 35, if this remained in circuit instead of being bypassed by contact 47, 48.

It should be pointed out that the invention is not to be considered limited to the actual arrangements and constructions described above, since many changes may be made in respect of the details thereof within the scope of the appended claims.

What I claim and desire to secure by Letters Patent is:

1. An electromagnetic relay system for supervising the insulation of an electrical installation, comprising a relay, said relay including at least two windings connected in series to a load circuit of the installation and an armature actuated by both of said windings, means for applying a supervising voltage through said windings to said load circuit at least at no-load conditions of the load circuit, the number of turns and the resistance of one of said windings being such as to enable it to attract the armature, on the occurrence of a slight flow of current through the said two windings caused by the said supervising voltage in the presence of a small insulation fault in the load circuit, means associated with said armature for applying a normal supply voltage through only the other of said windings to the load circuit, the number of turns and the resistance of said other winding being such as to enable it, although incapable of maintaining the armature attracted when energized by a current caused by the normal supply voltage in the presence of a small insulation fault in the load circuit, to do that when energized by a current caused by said supply voltage with the minimum normal load switched on in the load circuit, and means controlled by said armature for producing warning signals in response to operation of said relay under said supervising voltage.

2. An electromagnetic relay system for supervising the insulation of an electrical installation, comprising a relay, said relay including at least two windings connected in series to a single-phase load circuit of the installation and an armature actuated by both of said windings, means for applying a supervising voltage through said windings to said load circuit at least at no-load conditions of the load circuit, the number of turns and the resistance of one of said windings being such as to enable it to attract the armature, on the occurrence of a slight flow of current through the said two windings caused by the said supervising voltage in the presence of a small insulation fault in the load circuit, means associated with said armature for applying a normal supply voltage through only the other of said windings to the load circuit, the number of turns and the resistance of said other winding being such as to enable it, although incapable of maintaining the armature attracted when energized by a current caused by the normal supply voltage in the presence of a small insulation fault in the load circuit, to do that when energized by a current caused by said supply voltage with the minimum normal load switched on in the load circuit, means for connecting other load circuits to said relay to have said supervising voltage and normal supply voltage, respectively, applied thereto through said relay, and means controlled by said armature for producing warning signals in response to operation of said relay under said supervising voltage.

3. An electromagnetic relay system for supervising the insulation of an electrical installation, comprising a relay, said relay including at least two windings connected in series and an armature actuated by both of said windings, switch means for alternately connecting a single-phase load circuit of the installation at will to said windings and to a supply of normal operating voltage, means for applying a supervising voltage through said windings to the said load circuit in the case of said switch means connecting the latter to said windings, the number of turns and the resistance of one of said windings being such as to enable it to attract the armature, on the occurrence of a slight flow of current through the said two windings caused by the said supervising voltage in the presence of a small insulation fault in the load circuit, means associated with said armature for applying a normal supply voltage through only the other of said windings to the load circuit, the number of turns and the resistance of said other winding being such as to enable it, although incapable of maintaining the armature attracted when energized by a current caused by the normal supply voltage in the presence of a small insulation fault in the load circuit, to do that when energized by a current caused by said supply voltage with the minimum normal load switched on in the load circuit, and means controlled by said armature for producing warning signals in response to operation of said relay under said control voltage.

4. An electromagnetic relay stystem for supervising the insulation of an electrical installation, comprising a relay, said relay including three windings connected in series to a load circuit of the installation, an armature actuated by the first two of said windings and a second armature actuated by the third of said windings, means for applying a supervising voltage through said windings to said load circuit at least at no-load conditions of the load circuit, the number of turns and the resistance of one of the two windings actuating the first armature being such as to enable it to attract this armature, on the occurrence of a slight flow of current through said three windings caused by the said supervising voltage in the presence of a small insulation fault in the load circuit, means associated with said first armature for applying a normal supply voltage through only the second of said two windings actuating the first armature and through the said third winding to the load circuit, the number of turns and the resistance of said second winding being such as to enable it, although incapable of maintaining the associated first armature attracted when energized by a current caused by the normal supply voltage in the presence of a small insulation fault in the load circuit, to do that when energized by a current caused by said supply voltage with the minimum normal load switched on in the load circuit, means controlled by said first armature for producing warning signals in response to operation of said relay under said supervising voltage, means associated with said second armature for applying the normal supply voltage through the third winding alone to the load circuit, the number of turns and the resistance of said third winding being such as to enable it, on the occurrence of a strong flow of current through the second and third windings caused by the normal supply voltage at the presence of a short-circuit fault in the load circuit, to attract the said second armature and direct the current through the third winding alone, and means controlled by said second armature for producing alarm signals in response to operation of said relay under said supply voltage during short-circuit conditions.

5. An electromagnetic relay system for supervising the insulation of an electrical installation, comprising a relay, said relay including at least two windings connected in series to a single-phase load circuit of the installation and an armature actuated by both of said windings, means for applying supervising voltage through said windings to said load circuit at least at no-load conditions of the load circuit, the number of turns and the resistance of one of said windings being such as to enable it to attract the armature, on the occurrence of a slight flow of current through the said two windings caused by the said supervising voltage in the presence of a small insulation fault in the load circuit, means associated with said armature for applying a normal supply voltage through only the other of said windings to the load circuit, the number of turns and the resistance of said other winding being such as to enable it, although incapable of maintaining the armature attracted when energized by a current caused by the normal supply voltage in the presence of a small insulation fault in the load circuit, to do that when energized by a current caused by said supply voltage with the minimum normal load switched on in the load circuit, rotary switch means for connecting multi-phase load circuits to said relay to have said supervising voltage and said normal supply voltage, respectively, applied successively to each phase separately and between each two phases through said relay, and means controlled by said armature for producing warning signals in response to operation of said relay under said supervising voltage.

FOLKE BROR LORENS HAIN.

REFERENCES CITED

The following references are of record in the file of this patent:

UNITED STATES PATENTS

| Number | Name | Date |
|---|---|---|
| 2,052,057 | Reid | Aug. 25, 1936 |
| 2,075,822 | Miller | Apr. 6, 1937 |
| 2,276,546 | Pool | Mar. 17, 1942 |
| 2,474,742 | Kuhn | June 28, 1949 |
| 2,484,358 | Stapleton | Oct. 11, 1949 |